United States Patent
Lotz

(10) Patent No.: US 6,189,770 B1
(45) Date of Patent: Feb. 20, 2001

(54) METHOD OF PRODUCING SECTIONAL STRIPS AND SECTIONAL SHEETS

(75) Inventor: Werner Lotz, Meschede (DE)

(73) Assignee: Honsel AG (DE)

( * ) Notice: Under 35 U.S.C. 154(b), the term of this patent shall be extended for 0 days.

(21) Appl. No.: 08/993,399

(22) Filed: Dec. 18, 1997

(30) Foreign Application Priority Data

Dec. 18, 1996 (DE) ............................................. 196 52 744

(51) Int. Cl.⁷ .............................. B23K 31/02; B23K 1/20
(52) U.S. Cl. ........................ 228/235.2; 228/205; 228/206
(58) Field of Search ................................ 228/235.2, 205, 228/206, 262.5

(56) References Cited

U.S. PATENT DOCUMENTS

| | | | |
|---|---|---|---|
| 2,693,121 | * 11/1954 | Dight | 78/93 |
| 3,632,034 | 1/1972 | Kozak et al. | |
| 3,639,974 | * 2/1972 | Finnegan | 29/493 |
| 3,650,455 | * 3/1972 | Rutter et al. | 228/6 |
| 3,734,385 | 5/1973 | Kozak et al. | |
| 3,769,687 | * 11/1973 | Kozak et al. | 29/471.1 |
| 4,354,301 | * 10/1982 | Takeuchi et al. | 29/160.6 |
| 4,423,120 | * 12/1983 | Paulus et al. | 428/614 |
| 4,610,070 | * 9/1986 | Gold et al. | 29/429 |
| 4,717,068 | 1/1988 | Meyer | 228/203 |
| 4,826,736 | * 5/1989 | Nakamura et al. | 428/613 |
| 5,042,711 | * 8/1991 | Iskenderian et al. | 228/235 |
| 6,002,098 | * 12/1999 | Pircher et al. | 219/121.64 |

FOREIGN PATENT DOCUMENTS 2630844  1/1978  (DE).
8304036  7/1984  (DE).
19502140  5/1996  (DE).
2017541  10/1979  (GB).

OTHER PUBLICATIONS

Patent Abstract of Japan vol. 007 No. 031 Feb. 8, 1983 and Japan 57–187190 Nov. 17, 1982.
Patent Abstrat of Japan vol. 006 No.193, Oct. 2, 1982 and Japan 57–100887 Jun. 23, 1982.
Patent Abstract of Japan vol. 013 No. 229 mai 26, 1989 and Japan 01–044287 Feb. 16, 1989.
Auszug (Seite 468) aus Brockhaus ABC, Naturwissenschaft und Technik, Brockhaus Verlag, Leipzig, Apr. 1986 und;.
Auszug (Seite 41 bis 45) aus "Walzen von Flachprodukten", DGM Informationsgesellschaft mbH Verlag, 1994;.
Sonderdruck aus der Zeitschrift "stahl und eisen" 111 (1991), Heft 7, Seiten 93–99;.
Artikel von Holger Eisentraut aus "Maschinenmarkt", Würzburg 99 (1993) 36, seiten 78–80.

* cited by examiner

Primary Examiner—Patrick Ryan
Assistant Examiner—Kiley Stoner
(74) Attorney, Agent, or Firm—Ostrolenk, Faber, Gerb & Soffen, LLP

(57) ABSTRACT

A method of producing sectional strips and sectional sheets of different thicknesses over the width, in which at least two metal strips or metal sheets of different widths are joined to each other by roll bonded cladding which thins the thickness of the overlaid strips. One strip is wider than the other strip which is narrower. The two strips are arranged symmetrically to the rolling direction center line. The facing surfaces of the two overlaid strips may be prepared for bonding them. The invention also concerns sectional strips or sectional sheets produced by the method.

13 Claims, 2 Drawing Sheets

METHOD OF PRODUCING SECTIONAL STRIPS AND SECTIONAL SHEETS

BACKGROUND OF THE INVENTION

The present invention relates to a method of producing sectional strips and sectional sheets having different thicknesses over their widths and to sectional strips and sectional sheets produced by the method.

Sections produced by extrusion, particularly closed hollow sections, can be extruded with different wall thicknesses. But a minimum wall thickness of at least 1.2 mm is required in the thinnest regions. Sections with thinner wall thicknesses may be produced only from thinner sheets by folding or roll forming. But, they then have the same wall thickness throughout, which corresponds to the greatest required wall thickness.

For lightweight structural sections, the greatest wall thickness is often required only in specific regions, for strength, while lesser wall thicknesses are acceptable for use in other regions. Such lightweight structural sections are particularly desired in automotive engineering, to save as much weight as possible on the vehicle.

Cold rolling strips or sheets, in particular of aluminum or aluminum alloys, cannot produce different thicknesses, since the thinner regions suffer a considerably greater degree of deformation than the thicker regions and are therefore stretched considerably more in length than the thicker regions. This causes backward slip of material ahead of the roll groove in the thinner region, with consequent wave formation and finally leads to tearing of the strip or sheet passed through the rolling stand.

SUMMARY OF THE INVENTION

The object of the invention is to provide a method of producing sectional strips and sectional sheets of different thicknesses over the width of the sheet or strip, to be controlled in terms of rolling technology for producing sectional strips and sectional sheets of high quality and which are suitable for producing sheet sections by folding or roll forming.

The method of producing sectional strips and sectional sheets of different thicknesses over the width according to the invention comprises joining at least two overlaid strips or sheets of different widths, as measured across the roll direction, to each other by roll bonded cladding.

Roll bonded cladding is known for applying metallic coverings. Roll bonded cladding enables the widest variety of metals to be joined to one another after suitable pretreatment. However, the known cladding method serves only for applying thick, impervious coverings to a base metal. Such coatings are intended, for example, as corrosion protection or as protection against chemical attack in chemical apparatus engineering or as lustrous material, for example in the lighting industry. By contrast, the roll bonded cladding method of the invention is used for joining at least two overlaid strips or sheets of prescribed, different widths to each other to obtain sectional strips and sectional sheets with a step change in thickness and which are then usable for further processing into sheet sections.

Tests have shown that a different backward slip ahead of the respective roll grooves caused by the deforming likewise occurs in roll bonded cladding. Surprisingly, the tests have shown that this backward slip is compensated by the different drawing in rate of the strips or sheets, whereby no wave formation and no tearing occurs ahead of the roll grooves.

So that the strips or sheets joined by roll bonded cladding are completely straight when they emerge from the roll groove, it is advantageous if the at least two strips or sheets are joined to each other symmetrically in the rolling direction with respect to the longitudinal center line of different thicknesses, i.e., either the narrower strip is rolled centrally onto the wider strip, or two or more narrower strips, which are spaced apart and symmetrical with respect to the longitudinal center line, are rolled on in line with the outer edges of the wider strip.

If a sectional strip or sectional sheet with only one change in thickness is required, the strips or sheets joined to each other by roll bonded cladding may be slit along the longitudinal center line after the roll bonded cladding. Of course, a plurality of sectional strips or sectional sheets may also be produced by multiple slitting.

Preferably, at least two strips or sheets can be rolled to the prescribed thickness by roll bonded cladding in one pass. It must be ensured that the degree of deformation caused by the roll bonded cladding is the same for the at least two strips or sheets, i.e., that the roll bonded cladding takes place, for example, with a degree of deformation of 60%. Accordingly, if the thinner region originally has a thickness of 3 mm, it is deformed to 1.2 mm. The thicker region, which comprises two strips or sheets lying one on top of the other and which may have an initial thickness of 5 mm, has to be deformed to 2 mm. This controllable ratio deformation is obtainable when the overlying strips or sheets are of the same material or have the same deformability under pressure.

When using strips or sheets of aluminum or aluminum alloys, their mutually facing surfaces may be freed of their oxide layers immediately before roll bonded cladding so that they can then be joined to each other homogeneously, since the thus activated surfaces of aluminum or aluminum alloy have a great affinity for each other.

Preferably, the roll bonding is performed between two cooperating rollers, profiled to produce the desired deformations and also to confine the widths of the strips or sheets, so that they will displace linearly upon being deformed.

Since there are linear displacements in the rolling direction between the strips in the roll groove during roll bonded cladding, this produces a bond which is equivalent to a bond carried out by means of friction welding.

The strips or sheets to be joined to each other by roll bonded cladding may have the same or different initial thicknesses and final thicknesses. As a result, sectional strips and sectional sheets can be produced which comprise strips or sheets of different widths and different thicknesses over the width joined by roll bonded cladding. Sectional strips or sectional sheets are particularly preferred which comprise two strips or sheets of different widths and each having a thickness of 3 mm and 2 mm, which are joined to each other by roll bonded cladding in such a way that, after roll bonded cladding, the thinner region has a thickness of 1.2 mm and the thicker region has a thickness of 2.0 mm.

These sectional strips or sectional sheets can be used for producing sheet sections as lightweight structural sections for vehicle construction if, for example, an age-hardening aluminum alloy, for example AlMgSi1F21, is used for both layers. After the roll bonded cladding, the sectional strips or sectional sheets are solution annealed, quenched and stretched and can be subsequently converted into sheet sections of different material thicknesses in different regions by folding or roll forming.

Other features and advantages of the present invention will become apparent from the following description of the invention which refers to the accompanying drawings.

DETAILED DESCRIPTION OF THE INVENTION

Figure 1:
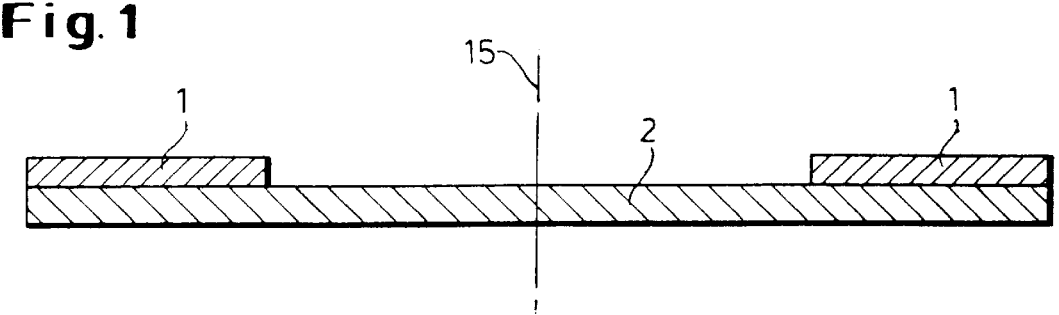
FIG. 1 shows a transverse cross-sectional representation of a wide strip and two narrow strips placed on the wide strip before roll bonded cladding.

FIG. 1 shows a cross section through two narrow metal strips 1 applied on a wide metal strip 2. The outer edges of the narrow strips 1 are in line with the outer edges of the wide strip 2. The narrow strips 1 are arranged symmetrically with respect to a longitudinal center line 15 of the assembly of strips. The narrow strips 1 are somewhat thinner in their height or thickness than the wide strip 2 on which the strips 1 are disposed.

Figure 2:
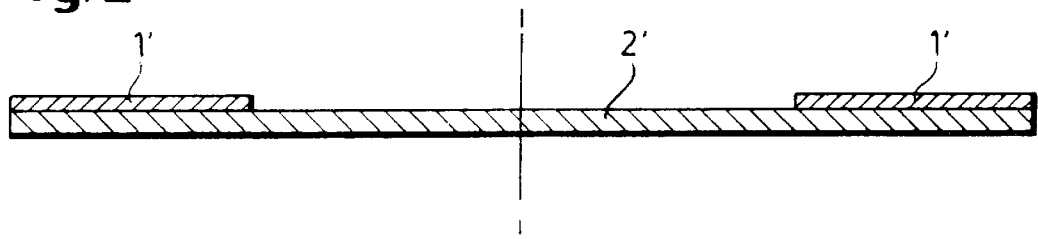
FIG. 2 shows the sectional strip or sectional sheet according to FIG. 1 after roll bonded cladding.

FIG. 2 shows the state of the same assembly after roll bonded cladding, during which the strips undergo a degree of deformation or flattening of about 60%. This produces an integral bond between the thickness reduced narrow strips 1' and the thickness reduced wide strip 2'. The cladding is done in one pass by a cladding roll or rolls.

The mutually facing surfaces of the strips 1, 2 are roughened and freed of their oxide layer, for example by brushing or pickling, immediately before the roll bonded cladding, so that the roll bonded cladding brings about an intimate bond in the desired layer thickness by the considerable deforming.

Figure 3:
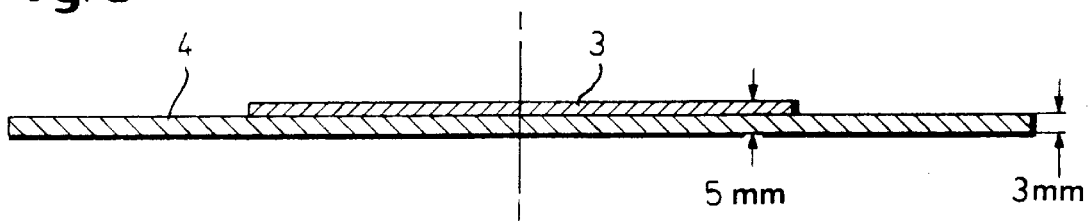
FIG. 3 shows a different embodiment of two strips placed one on top of the other before roll bonded cladding.
Figure 4:
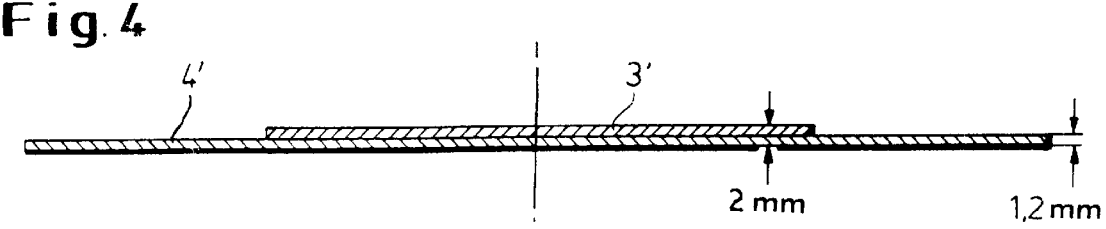
FIG. 4 shows a cross-section through a sectional strip according to FIG. 3 after roll bonded cladding.
Figure 5:
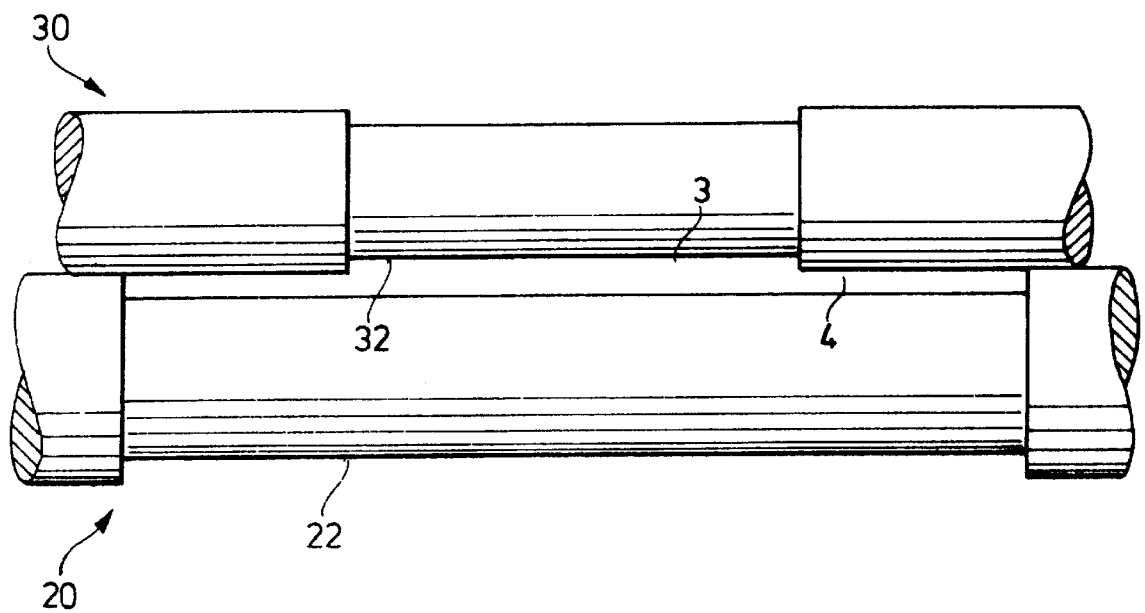
FIG. 5 is an elevation of two rollers performing roll bonded cladding.
Figure 6:
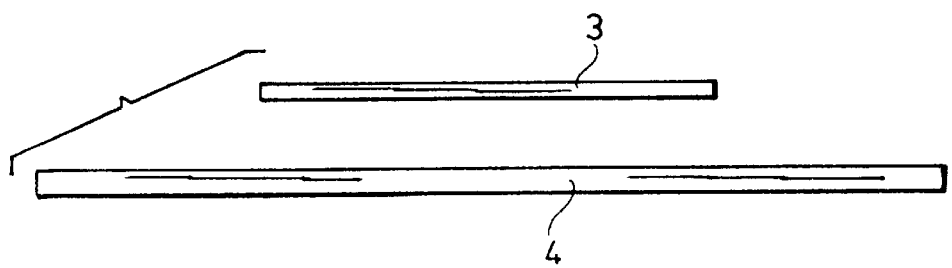
FIG. 6 shows two strips before roll bonded cladding.
Figure 7:
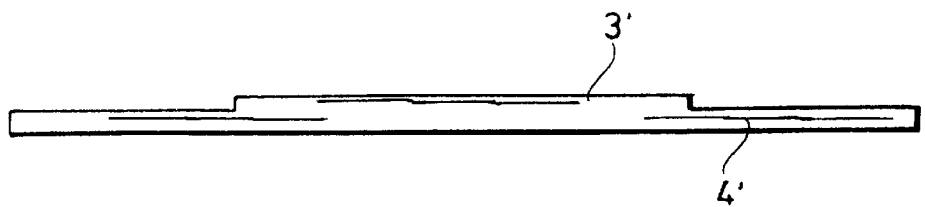
FIG. 7 shows the same two strips after roll bonded cladding.

FIGS. 3, 4 and 5 show a sectional strip comprising a narrower width strip 3, which is arranged symmetrically with respect to the longitudinal center line 15, and a wider strip 4. In FIGS. 3 and 6, the narrower strip 3 originally has a thickness of 2 mm and the wider strip 4 originally has a thickness of 3 mm for a total thickness of 5 mm where the strip 3 overlies the strip 4, before the roll bonded cladding. As shown in FIGS. 4 and 7, the roll bonded cladding reduces the total thickness to 2 mm and the thickness of the wider strip 4' to 1.2 mm in one pass, and without the widths of the regions 3' and 4' changing in the process. The two strips or sheets are rolled to the desired thickness in one pass.

The reason that the widths of the regions 3 and 4 do not change as they are deformed to regions 3' and 4' is the rollers used for the bonding. As shown in FIG. 5, the roll bonded cladding is performed between a lower roll 20 and an upper roll 30. The lower roll 20 has a depression 22 of the original width of the wider strip 4, but of the height of the final reduced thickness of the strip 4', whereby thinning of the thickness of the strip 4 to strip 4' should lengthen it without widening it. The upper roll 30 has a width to overlie and close off the depression 22 and has a narrower width depression 32 of the original width of the narrower strip 3, but of the height of the final reduced thickness of the strip 3', whereby thinning of the thickness of the strip 3 should lengthen it without widening it.

If the sectional strip 3', 4' according to FIG. 4 is slit along the longitudinal center line 15, two sectional strips with a step change in thickness are obtained.

The material used for the strips 1, 2 or 3, 4 is preferably an age-hardening aluminum alloy, for example AlMgSi1F21. In the solution annealed state, these can be clad by roll bonding to each other with a degree of deformation of 60%. In the process a metallic bond comparable to friction welding is formed.

In the example presented, the roll bonded cladding is carried out with the same alloys. But, it is also possible to join different alloys or even different materials or metals, for example copper and aluminum, if this is required, for sheet sections produced from sectional strips or sectional sheets of different thicknesses over the width.

Although the present invention has been described in relation to particular embodiments thereof, many other variations and modifications and other uses will become apparent to those skilled in the art. It is preferred, therefore, that the present invention be limited not by the specific disclosure herein, but only by the appended claims.

What is claimed is:

1. A method of producing sectional strips and sectional sheets of metal having different thicknesses over a first width of the strip or sheet produced, the method comprising the steps of:

providing a first strip or sheet having the first width;

providing a second strip or sheet having a second width which is less than the first width;

overlaying on the first strip or sheet the entire second width of the second strip or sheet; and joining the first and the second strips or sheets of different widths by roll bonded cladding; and reducing the thicknesses of the first and the second strips or sheets by approximately 60% with a constant deformation during the roll bonded cladding.

2. The method of claim 1, wherein when the second strip or sheet is overlaid, and wherein the first and the second strips or sheets are positioned symmetrically along the rolling direction with respect to a longitudinal centerline of the first and the second strips or sheets.

3. The method of claim 1, further comprising the step of slitting the joined first and second strips or sheets parallel to the longitudinal centerline thereby forming two or more sectional strips or sectional sheets after the roll bonded cladding.

4. The method of claim 1, wherein the first and the second strips or sheets are rolled to the described thickness in one pass of roll bonded cladding.

5. The method of claim 1, wherein the metals of the first and the second strips or sheets are selected so that the degree of deformation of the first and the second strips or sheets is the same during roll bonded cladding.

6. The method of claim 5, wherein each of the strips or sheets to be joined has a different respective initial thickness and a different respective final thickness.

7. The method of claim 1, wherein the strips or sheets are of aluminum or aluminum alloy and have mutually facing surfaces when they are overlaid, the method further comprising freeing the mutually facing surfaces of the strips or sheets of their oxide layer immediately before the roll bonded cladding of the strips or sheets.

8. The method of claim 7, wherein the oxide layers are stripped by brushing or by pickling.

9. The method of claim 1, wherein each of the strips or sheets to be joined has a different respective initial thickness and a different respective final thickness.

10. The method of claim 1, further comprising the steps of:

providing a third strip or sheet having a third width; and overlaying the entire third width of the third strip or sheet on the first strip or sheet, wherein the second and third strips or sheets are overlaid on the first strip or sheet symmetrical with respect to a longitudinal centerline across the first width.

11. The method of claim 10, wherein the second and third strips or sheets are separated from each other around the longitudinal centerline.

12. The method of claim 1, wherein during the roll bonded cladding, the thickness of each of the strips or sheets is reduced by the roll bonded cladding while the width of the strips or sheets is not changed.

13. The method of claim 12, wherein during roll bonded cladding, the strips or sheets are restrained from expanding in the width direction as their thicknesses are reduced.

\* \* \* \* \*